United States Patent
Matoba et al.

(10) Patent No.: US 7,502,341 B2
(45) Date of Patent: Mar. 10, 2009

(54) MULTIBAND MOBILE COMMUNICATION SYSTEM AND TRANSMITTER USED THEREIN

(75) Inventors: Naoto Matoba, Fujisawa (JP); Masashige Shirakabe, Yokohama (JP); Takatoshi Sugiyama, Yokohama (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 233 days.

(21) Appl. No.: 11/232,009

(22) Filed: Sep. 22, 2005

(65) Prior Publication Data
US 2006/0063543 A1 Mar. 23, 2006

(30) Foreign Application Priority Data
Sep. 22, 2004 (JP) ............................. 2004-275588

(51) Int. Cl.
*H04Q 7/20* (2006.01)
(52) U.S. Cl. ..................... 370/319; 370/322; 370/329; 370/343; 370/339.43; 370/395.21; 455/510; 455/516; 455/450; 455/451; 455/452
(58) Field of Classification Search ................ 370/319, 370/329, 343, 465, 322, 395.21, 395.43; 455/510, 516, 450, 451, 452, 452.2, 39, 40, 455/41, 502, 503, 509
See application file for complete search history.

(56) References Cited

U.S. PATENT DOCUMENTS

| | | | |
|---|---|---|---|
| 5,504,939 A | | 4/1996 | Mayrand et al. |
| 5,914,950 A | * | 6/1999 | Tiedemann et al. ......... 370/348 |
| 6,134,443 A | | 10/2000 | Spann et al. |
| 6,504,828 B1 | * | 1/2003 | Corbett ....................... 370/331 |
| 6,516,192 B1 | | 2/2003 | Spaur et al. |
| 6,546,250 B1 | * | 4/2003 | Turcotte et al. ............. 455/437 |
| 6,954,446 B2 | * | 10/2005 | Kuffner ....................... 370/335 |
| 2002/0039884 A1 | | 4/2002 | Raynes et al. |
| 2003/0050070 A1 | | 3/2003 | Mashinsky et al. |
| 2003/0128658 A1 | * | 7/2003 | Walton et al. ............... 370/208 |
| 2004/0001429 A1 | * | 1/2004 | Ma et al. ..................... 370/210 |

(Continued)

FOREIGN PATENT DOCUMENTS

GB 2 398 705 A 8/2004

(Continued)

OTHER PUBLICATIONS

U.S. Appl. No. 11/231,794, filed Sep. 22, 2005, Matoba, et al.

(Continued)

*Primary Examiner*—Alexander Eisen
*Assistant Examiner*—Julio R Perez
(74) *Attorney, Agent, or Firm*—Oblon, Spivak, McClelland, Maier & Neustadt, P.C.

(57) ABSTRACT

A transmitter used in the multiband environment includes a frequency allocation unit (106) configured to select and allocate a frequency band that satisfies a user QoS from among multiple separate frequency bands currently available for the user, a parameter determination unit (111) configured to determine a transmission parameter required for signal transmission based on the allocated frequency band, and a multi-user scheduling control unit (110) configured to determine a transmission schedule for multiple users taking into account the frequency bands allocated to the multiple users.

2 Claims, 7 Drawing Sheets

U.S. PATENT DOCUMENTS

| | | | |
|---|---|---|---|
| 2004/0190485 A1* | 9/2004 | Khan | 370/349 |
| 2004/0203815 A1* | 10/2004 | Shoemake et al. | 455/450 |
| 2005/0013352 A1* | 1/2005 | Hottinen | 375/219 |
| 2005/0064869 A1* | 3/2005 | Ansorge | 455/435.2 |
| 2005/0070290 A1* | 3/2005 | Baggstrom et al. | 455/445 |

FOREIGN PATENT DOCUMENTS

| | | |
|---|---|---|
| JP | 11-512267 | 3/1997 |
| JP | 2003-18647 | 1/2003 |
| JP | 2003-101506 | 4/2003 |
| WO | WO 97/09838 | 3/1997 |
| WO | WO 2004/004407 A1 | 1/2004 |

OTHER PUBLICATIONS

U.S. Appl. No. 11/232,009, filed Sep. 22, 2005, Matoba, et al.
U.S. Appl. No. 11/232,023, filed Sep. 22, 2005, Matoba, et al.
U.S. Appl. No. 11/232,018, filed Sep. 22, 2005, Matoba, et al.

* cited by examiner

MULTIBAND MOBILE COMMUNICATION SYSTEM AND TRANSMITTER USED THEREIN

FIELD OF THE INVENTION

The present invention generally relates to a wireless communication system, and more particularly, to a multiband wireless communication technology realizing appropriate parameter selection and transmission scheduling in a multiband communication system that allows users to share the available spectrum, including not only exclusively licensed frequency bands, but also license-exempt frequency bands and allowed frequency bands under registry systems, taking into account differences in required OoS and frequency-based fluctuation characteristics.

BACKGROUND OF THE INVENITON

The domain of applicability of wireless communications is expanding from transmission media for telecommunications to cableless connection means at a range as close as several centimeters. In fact, short-range and/or close-range wireless communication schemes, including Bluetooth and wireless LAN, have already been put to practical use. Such communication schemes are superior in adaptive flexibility. Under these circumstances, it is expected that in the near future wireless communication functions are to be built in all kinds of equipment and devices.

Along with diversification of communication systems, a single-system communication scheme based on a global standard, such as GSM or IMT-2000, is shifting to a multi-system communication scheme in which different systems for different purposes coexist to build up flexible communications. In accordance with the mobile multi-system environment, a software defined radio (a so-called "clever radio") is being developed. A software defined radio is a radio whose functions (including channel modulation waveforms) are defined by overwriting software in a single radio transmitter/receiver (hardware) so as to be applicable to various wireless schemes. This technology allows adaptive connection to different network systems, and sufficiently responds to application-oriented communications.

One of the obstacles in the way of this technical innovation is shortage of spectrum. One important reason for the shortage of spectrum is the licensing-based governing structure. Under the current spectrum management scheme, radio waves are exclusively allocated to telecommunication carriers to bring them under control. Each of the carriers has to deal with traffic fluctuation using only the licensed spectrum.

To alleviate such circumstances, a concept of "open-spectrum" for sharing the radio spectrum among users, as well as reorganization of the spectrum, has been proposed.

For example, WO97/09838 (Publication 1) discloses a method for sharing unrestricted frequency bands among different wireless communication systems. To be more precise, a first frequency band is allocated to a first wireless communication system, and a second frequency band is allocated to a second wireless communication system within a prescribed range. A non-allocated frequency band in that range is shared by the first and second communication systems without synchronization.

JP 2003-101506A (Publication 2) discloses a wireless communication terminal device that uses different types of frequency bands depending on the communication environment in dual mode wireless communication. For example, the device uses the 2.4 GHz band outside, which band is not subjected to restriction of the Radio Law, while using the 5.2 GHz band indoors. In dual-mode wireless communications using different frequency bands, different modulation schemes are employed generally. However, in this publication, the device employs a common modulation scheme by appropriately adjusting the parameters, thereby realizing dual-mode communication.

On the other hand, in a wireless communication system using an adaptive modulation scheme in a single spectrum band, slot allocation is carried out so as to give a higher priority to a terminal device with a higher transmission ability during the transmission scheduling among terminal devices with different transmission abilities in order to prevent a shortage of slots due to an increase of the number of wireless terminal devices. This arrangement can improve the overall throughput of the system. See, for example, JP 2003-18647A (Publication 3).

The above-described Publication 1 (WO97/09838) aims to increase the efficiency of spectrum use as a whole by using an unused spectrum band shared among different systems, in addition to an exclusively allocated spectrum band.

Publication 2 (JP 2003-101506A) aims to appropriately use a restricted spectrum band and an unrestricted spectrum band (provided for services that do not require license from the government), while preventing an increase of hardware by appropriately selecting parameters according to the spectrum band being used.

Both publications employ a concept of parallel use or sharing of different spectrum bands. However, the spectrum bands used in this publication are very limited and fixed, and there is no technical approach to adaptive allocation of a currently available optimum spectrum band and/or the optimum channel in that spectrum band taking into account the user QoS and fairness among users.

In addition, neither publication refers to optimization of transmission parameters according to the user QoS, while following the characteristic differences (as to propagation loss or the available bandwidth) among different spectrum bands, and optimization of transmission scheduling among multiple users.

Publication 3 is addressed to allocation of resources to different types of terminal devices with different performance levels in a single spectrum band. Accordingly, this technique cannot be applied as it is to the multiband environment where multiple separate spectrum bands are used by a single system or shared by different systems. Publication 3 does not address maximization of the system efficiency taking the requested QoS and characteristic differences among separate spectrum bands into account in the multiband mobile communication environment.

It is expected that in the future the radio frequency spectrum management policy will be revised, and that a registration system for registering those operators who meet the standard is going to be employed, besides the current licensing system that allows exclusive license of a specific spectrum. In addition, unlicensed spectrum bands may be further opened up in the future. From this viewpoint, consideration has to be given to coexistence of different types of telecommunication carriers, including TV networks, broadcasters, and mobile communication services, as well as to reduction of interference and efficient allocation of available spectrum bands and/or channels in each spectrum band.

SUMMARY OF THE INVENTION

Therefore, it is an object of the present invention to provide a transmitted used in a multiband mobile communication system that can select and allocate the optimum frequency band or the optimum channel in the frequency band from currently available frequency bands in the entire spectrum range, and that can control the signal processing parameters in the optimum manner according to the user QoS and differences in fluctuation characteristics among different spectrum bands.

It is another object of the invention to provide a transmitter used in a multiband mobile communication system that performs the optimum scheduling in both the frequency and time dimensions, appropriately using multiple separate spectrum bands.

In one aspect of the invention, a transmitter comprises:
(a) a frequency allocation unit configured to select and allocate a frequency band that satisfies a user QoS from among multiple separate frequency bands currently available for the user;
(b) a parameter determination unit configured to determine a transmission parameter required for signal transmission based on the allocated frequency band; and
(c) a multi-user scheduling control unit configured to determine a transmission schedule for multiple users taking into account the frequency bands allocated to the multiple users.

In a preferred example, in multiband allocation, the spectrum allocation unit may allocate multiple channels across different frequency bands to a single user if there is not a single frequency bandwidth that meets the QoS requested by the user. In this case, the transmission parameter determination unit controls the transmission parameter according to the interval between the allocated spectrum bands.

For example, if the interval between the allocated frequency bands is greater than a threshold, the optimum transmission parameter is determined for each of the allocated frequency bands. If the interval is narrower than the threshold, the transmission parameter is determined collectively for the allocated frequency bands.

In addition, when multiple channels are allocated to a single user across multiple separate frequency bands, the multi-user scheduling unit performs transmission scheduling for multiple users depending on the interval between the allocated frequency bands.

Using such a transmitter, selection of the optimum parameter and multi-user scheduling can be performed taking into account the user QoS and the differences in fluctuation characteristics of different frequency bands.

In another aspect of the invention, a wireless communication system including a mobile station and a base station and making use of multiple separate frequency bands is provided. In this system, at least one of the mobile station and the base station has the above-described transmitter capable of selecting and allocating the optimum frequency band(s) from the currently available different frequency bands.

By furnishing at least one of the mobile station and the base station with the above-described transmitter, the spectrum use efficiency is improved as a whole over the entire system.

Simultaneous use of multiple frequency bands leads to improvement of the spectrum use efficiency.

Signal processing parameters can be regulated in the optimum manner according to the user QoS and the fluctuation characteristic differences between different frequency bands.

Multi-user scheduling is performed in frequency and time directions.

BRIEF DESCRIPTION OF THE DRAWINGS

Features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
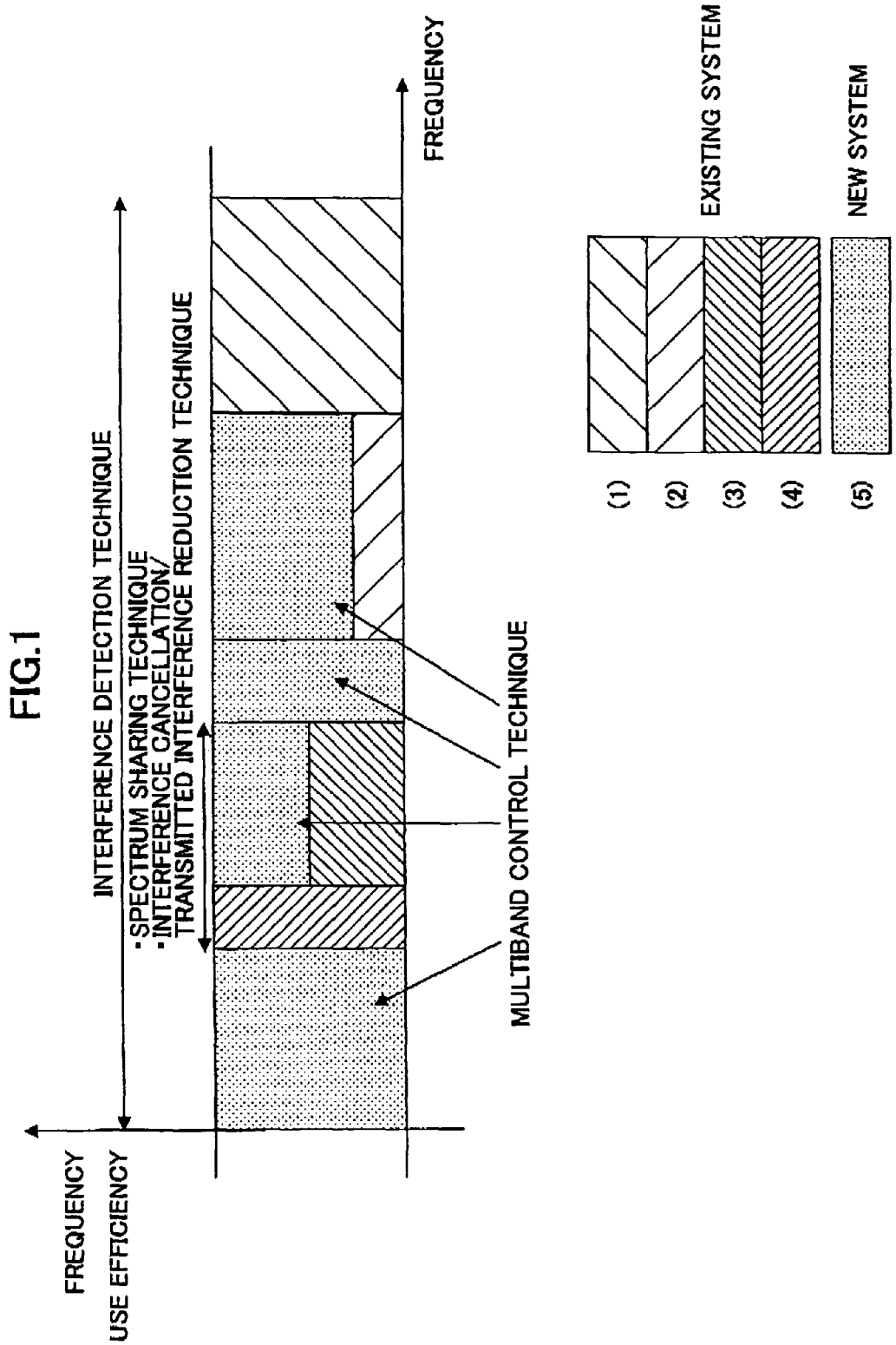
FIG. 1 is a schematic diagram illustrating the concept of multiband communication according to an embodiment of the invention.

FIG. 1 is a schematic diagram for illustrating a multiband spectrum allocation technique according to an embodiment of the invention. In the claims and specification, a "spectrum band" is a certain frequency band over a prescribed range, such as an exclusively licensed spectrum band, a registration-based spectrum band that becomes available upon registration, or an unlicensed spectrum band opened without a license. The spectrum band is distinguished from a frequency channel divided and included in a spectrum band.

In FIG. 1, the horizontal axis represents frequency and the vertical axis represents frequency use efficiency. Although spectrum bands (1) through (4) are allocated exclusively to existing systems, a new system may be able to make use of unlicensed bands or available room in the licensed bands in terms of improving the use efficiency. In the present invention, it is assumed that the system can make use of the dotted area labeled by symbol (5). Throughout the currently available spectrum range, a suitable frequency band is selected and allocated in the new system so as to maximize the spectrum use efficiency.

In this case, existing systems and the new system may coexist in the same spectrum band. Such coexistence includes a case in which different operators or different business categories exit together, and a case in which systems of different generations (e.g., the second generation and the third generation) provided by the same operator exist. At the same time, a single system may use multiple channels across different spectrum bands depending on the QoS and/or types of communication.

Accordingly, it becomes necessary not only to allocate the optimum frequency band from the currently available frequency bands, but also to perform efficient signal processing according to the QoS requested by users and differences in fluctuation characteristics of different spectrum bands. In the following, efficient spectrum allocation in the multiband environment is explained in detail based on the preferred embodiment.

Figure 2:
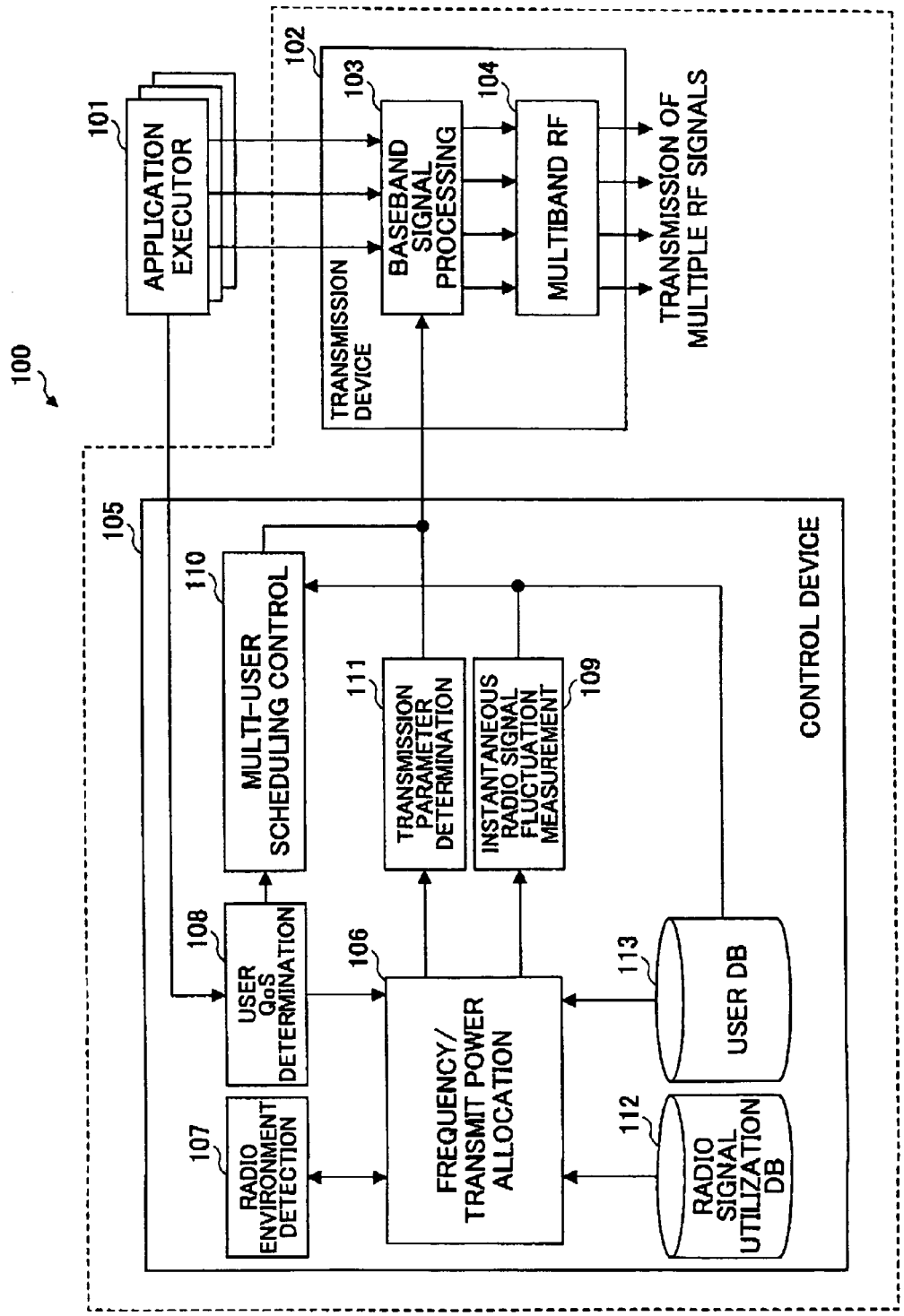
FIG. 2 is a functional block diagram of a transmitter used in a multiband communication system according to an embodiment of the invention.

FIG. 2 is a schematic block diagram of a transmitter 100 with a spectrum band allocation function according to an embodiment of the present invention. The transmitter 100 may be assembled into a user terminal (mobile terminal), or alternatively, it may be set in a base station. As long as the transmitter 100 is incorporated in at least one of the user terminal and the base station, efficient spectrum allocation can be performed in a mobile communication system in the multiband environment.

The transmitter 100 includes a transmission device 102 and a control device 105 connected to each other. The transmission device 102 includes a baseband signal processing unit 103 connected to an application executer 101, and a multi-band RF unit 104 connected to the baseband signal processing unit 103. If the transmitter 100 is assembled into a user terminal, the application executer 101 generates a transmission request when the user terminal is to perform wireless communications with a server or another user terminal. The application executer 101 executes various types of applications depending on the user terminal, and supplies digital transmission data to the baseband signal processing unit 103 of the transmission device 102. On the other hand, if the transmitter 100 is set in a base station, the data executed by the server or the application executer 101 of the user terminal are input to the baseband signal processing unit 102 of the base station transmission device 102 through a network.

The baseband signal processing unit 103 performs error correction coding, interleaving, modulation, and transmit power control using a coding rate, an interleave size, a modulation scheme and a transmit power appropriately selected according to the allocated spectrum bands, prior to multi-user scheduling (for setting a spectrum band and/or a frequency channel and time slots for signal transmission of each user). The optimization of these transmission parameters and the multi-user scheduling over multiple spectrum bands are explained in detail below. The baseband signal produced using the selected parameters from the input data are then supplied to the multiband RF unit 104. The multiband RF unit 104 converts the baseband signal into RF signals of multiple spectrum bands. Signal transmission is performed using the transformed RF signals.

The control device 105 includes a frequency/transmit power allocation unit 106, a radio environment detection unit 107, a user QoS determination unit 108, a transmission parameter determination unit 111, an instantaneous radio signal fluctuation measuring unit 109, and a multi-user scheduling control unit 110. The control device 105 further includes a radio signal utilization database (DB) 112 and a user database (DB) 113 connected to the frequency/transmit power allocation unit 106. The output of the user DB 113 is also supplied to the multi-user scheduling control unit 110. The output of the transmission parameter determination unit 111 is connected to the input to the baseband signal processing unit 103 of the transmission device 102. The user QoS determination unit 108 receives an output from the application executer 101.

The frequency/transmit power allocation unit 106 selects and allocates an optimum frequency band, bandwidth, and transmit power for each user. Different frequency bands may be selected and allocated for the uplink and downlink transmission, or alternatively, different frequency bands may be allocated for data transmission and control signal transmission, as is described below.

The radio environment detection unit 107 detects current radio conditions available for each of the users. For example, at least one of the currently available frequency bands and its bandwidth, parameters of other systems, the interference level of the system itself and the interference level generated from other systems, propagation loss, and shadowing is detected.

The user QoS determination unit 108 determines one or more of the average transmission rate, the delay (including the average delay, the maximum delay and the jitter), the frame error rate, the transmit power, the maximum transmission rate, and the minimum guaranteed transmission rate, based on the QoS information supplied from the application executor 101.

The instantaneous radio signal fluctuation measuring unit 109 measures instantaneous fluctuation in the allocated channel caused by fading of the desired signal and the interference wave in time and frequency dimensions.

The multi-user scheduling control unit 110 is connected to the baseband signal processing unit 103 of the transmission device 102 in order to control user scheduling in both frequency and time directions for each of the multiple users.

The transmission parameter determination unit 111 determines parameters used in baseband signal processing for converting the user data into transmission data sequences. In this example, the coding rate, the interleave size, the modulation scheme, and the transmit power control scheme are determined.

The radio signal utilization DB 112 stores information about each type of spectrum band. To be more precise, band types including spectrum bands exclusively licensed for specific operators (referred to as "licensed bands"), spectrum bands admitted for registered operators (referred to as "registration-based bands"), and spectrum bands opened to anybody who meets the conditions provided by the regulation (referred to as "unlicensed bands") are stored. An example of an unlicensed band is an industry science and medical (ISM) band at the 2.4 GHz band. The radio signal utilization DB 112 also stores restrictions imposed on use of the registration-based spectrum bands and the unlicensed spectrum bands. For example, information about restricted transmit power is stored.

The radio signal utilization DB 112 constantly updates and stores information as to which spectrum band is available in which area and in which time zone.

The user DB 113 stores user information, such as a user type, a priority level given to use each of the spectrum bands, a use plan, the transmission ability of the user equipment, restrictions on transmit power, signal processing ability, and available radio frequencies.

The user terminal may be furnished with a transmission device 102, while the control device 105 may be provided in the base station.

Next, explanation is made of allocation of frequency bands carried out by the frequency/transmit power allocation unit 106. The frequency/transmit power allocation unit 106 reads necessary information from the radio signal utilization DB 112 and the user DB 113, and selects candidates from available frequencies. Then the frequency/transmit power allocation unit 106 narrows the candidate selections with reference to the information supplied from the radio environment detection unit 107 and the user QoS determination unit 108, and determines the optimum frequency band and the bandwidth, as well as the necessary average transmit power, for each user. By selecting and narrowing the currently available candidate bands, frequency bands are appropriately allocated to the users, taking the user QoS into account, without geometric and/or time-based interference with other operators or telecommunication carriers. In this manner, available frequency resources can be shared.

Figure 3:
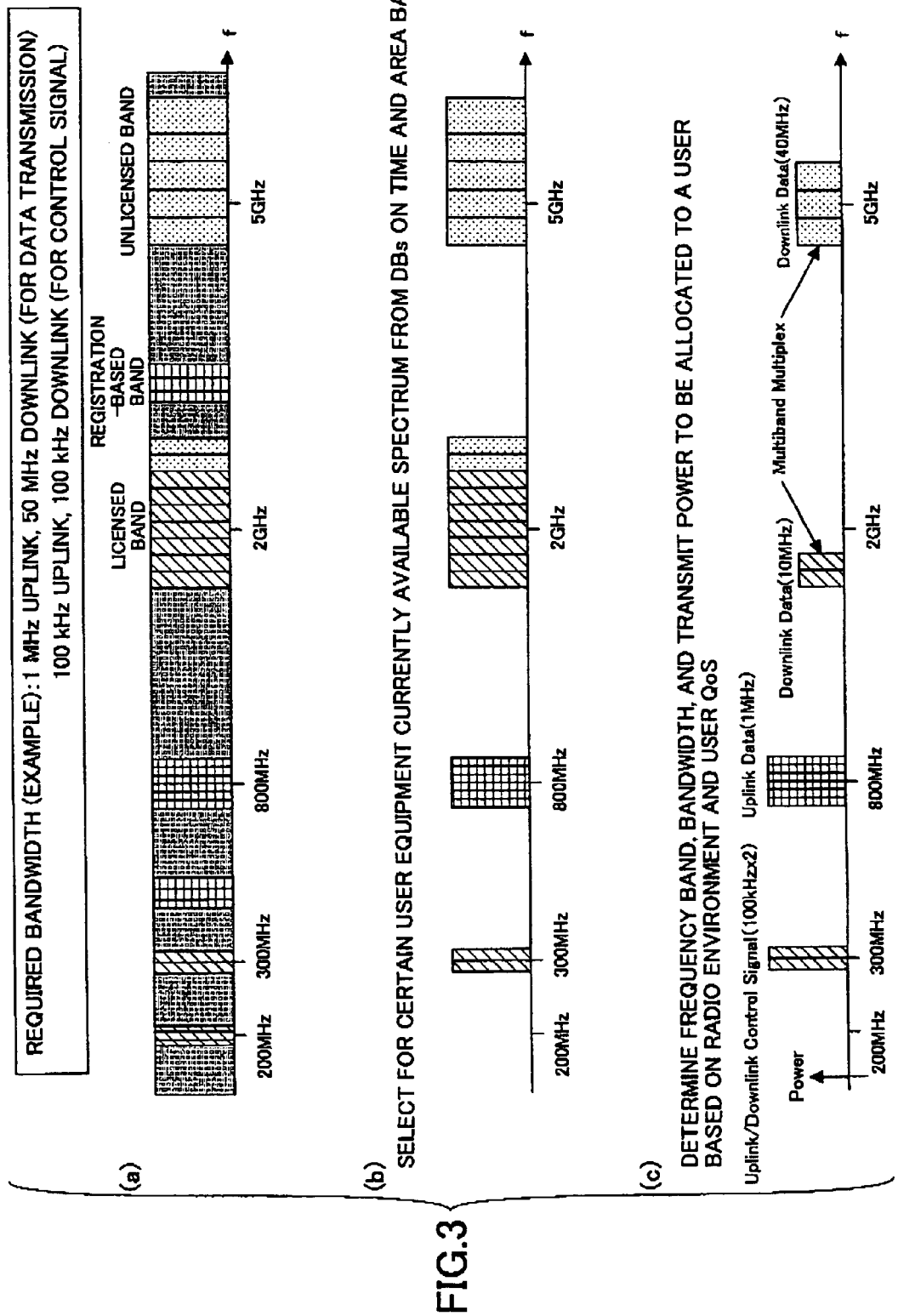
FIG. 3 is a schematic diagram showing an example of selection and allocation of multiple frequency bands according to an embodiment of the invention.

FIG. 3 is a more detailed example of allocation of frequency resources. There are many separate spectrum bands across the communication frequency range (FIG. 3(a)). Based on the information in radio signal utilization DB 112 and the user DB 113, candidates of frequency bands currently available in this specific area are selected within the ability of the user equipment (FIG. 3(b)). For example, a certain frequency (or a channel) in a licensed spectrum band of a certain broadcast system may be unused in a certain time interval (such as midnight or early morning), or a certain channel of another licensed band may be used in only specific areas.

There is also a channel that is allocated to an important system, but is unused almost all the time (such as a community wireless system or a disaster-control channel). By appropriately using such unused frequency bands or channels, the frequency use efficiency of the entire system should be improved.

On the other hand, in ubiquitous communications, there are a wide variety of user mobile stations with different performance levels and abilities. A high-performance mobile station is capable of signal processing in broadband wireless channels. It can increase transmit power, and can handle multiple radio frequencies simultaneously. In contrast, a simple and compact mobile terminal with less processing ability (such as a sensor) cannot process broadband signals, and its transmittable power level is low. For such simple equipment, available radio frequencies are also restricted because of the limits of the radio circuit.

Therefore, candidates of frequency bands available for the user equipment at that time in that area are selected based on the status of radio wave occupancy and the ability of the user equipment, as illustrated in FIG. 3(b). In the example shown in FIG. 3(b), the 300 MHz band, the 800 MHz band, the 2 CHz band, the 2.4 GHz band, and the 5 GHz band are selected as candidates.

Then, as illustrated in FIG. 3(c), the selected candidates are further narrowed based on the current radio environment and the QoS requested by the user to determine the optimum frequency band, bandwidth and transmit power. For example, the registration-based band and the unlicensed band are allocated to those users executing best-effort applications, users belonging to lower-priority groups, or users contracting for inexpensive use plans because the communication environments of these bands are likely to be degraded due to unexpected interferences. In contrast, the licensed band is preferentially allocated to those users executing real-time applications (such as audio/video communication), users belonging to higher-priority groups, or users contracting for expensive use plans.

Different frequency bands with different bandwidths may be allocated to the uplink and downlink transmissions. In addition, different frequency bands with different bandwidths may be selected for data transmission and control signal transmission. When the downlink traffic is several times as large as the uplink traffic (in accessing a server), allocating asymmetric bandwidths to the uplink and the downlink allows the asymmetric traffic to be handled in an efficient manner.

Depending on the type of a user mobile station, the available transmit power level may be restricted. In this case, a low frequency band with less propagation loss is allocated to the uplink to reduce the power consumption of the mobile station, while maintaining the communications area wide.

A low frequency band is also selected for control signal transmission that requires less delay, such that a signal-to-noise ratio required to sufficiently reduce the error rate is guaranteed. On the other hand, a higher frequency band with a broad bandwidth is selected for data transmission that allows a certain degree of delay, but requires high-rate transmission. In data transmission in a higher frequency range, occurrence of delay is acceptable to a certain degree, and instead, a retransmission technique is employed to achieve a high transmission rate.

In the example shown in FIG. 3(c), a channel of 200 kHz width in the 300 MHz band is allocated to uplink and downlink transmission of control signals. A 1 MHz channel of the 800 MHz band is allocated to the uplink data transmission, while 10 MHz in the 2 GHz band and 40 MHz of the 5 GHz band are allocated to the downlink data transmission.

If there is no available frequency band that has a bandwidth satisfying the user request, one or more available frequency bands may be allocated to a single user so as to guarantee the requested bandwidth.

In this manner, the frequency use efficiency of the entire system can be maximized so as to satisfy the user QoS (including the transmission rate, the delay, and the error rate), the ability of the user terminal equipment, and the radio communication environment.

Figure 4:
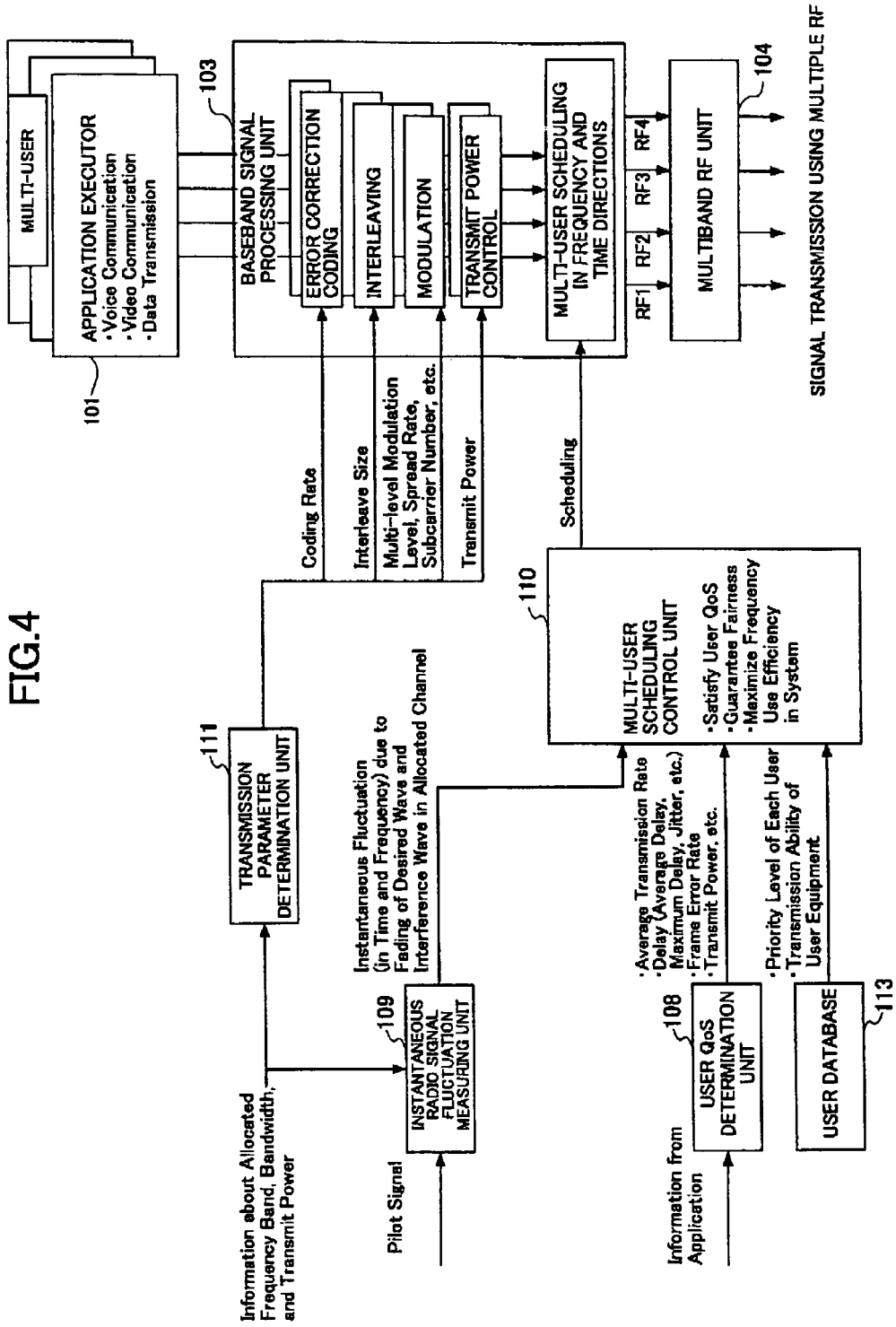
FIG. 4 is a diagram illustrating determination of the optimum parameters and multi-user scheduling based on the multiband spectrum allocation technique of an embodiment of the invention.

Next, explanation is made of selection of the optimum parameters in the baseband signal processing and multi-user scheduling in the multiband environment in conjunction with FIG. 4. FIG. 4 is a diagram illustrating optimization of the transmission parameters and multi-user scheduling according to an embodiment of the invention. In the conventional technique, adaptive coding, modulation, and multi-user scheduling are performed within a signal frequency band. However, when using multiple separate frequency bands in a single system or sharing specific frequency bands among different systems in the multiband environment, optimum parameter setting and multi-user scheduling have to be carried out in accordance with differences in fluctuation characteristics among different frequency bands, in addition to differences in user QoS.

The transmission parameter determination unit 111 of the control device 105 receives a frequency band, the bandwidth, and a transmit power selected by the frequency/transmit power allocation unit 106 (FIG. 2). Based on these information items, the transmission parameter determination unit 111 determines parameters to be used in the baseband signal processing unit 103 that converts user data into transmission sequences. In this example, a coding rate used in error correction coding, an interleave size used in interleaving, modulation parameters (a level of multi-level modulation, spread rate, the number of subcarriers, etc.), and a transmit power level used in transmit power control are determined and supplied to the baseband signal processing unit 103.

When using multiple separate frequency bands (in the multiband condition), the schemes of coding, interleaving, modulation and transmit power control vary depending on the allocated frequency band and its bandwidth. Accordingly, optimum parameters are determined for each of the allocated frequency bands. Adaptive modulation/coding may be employed to adaptively change the coding scheme and the multi-level modulation level according to the channel condition. If multiband multiplexing for multiplexing signals across one or more frequency bands is performed, as illustrated in FIG. 3(c), the parameter determination method may be changed depending on the interval between the selected frequency bands. For example, if the selected (allocated) frequency bands are far away from each other, the channel characteristics are different from each other, and therefore, different modulation schemes are to be employed. If the selected frequency bands are close to each other, modulation is performed commonly for these selected bands using the same parameters (multi-level modulation level, spread rate, the number of subcarriers, etc.) to improve the processing efficiency and reduce the workload of generating control signals. The same applies to selection of interleaving, adaptive coding, and accessing schemes.

Figure 5:
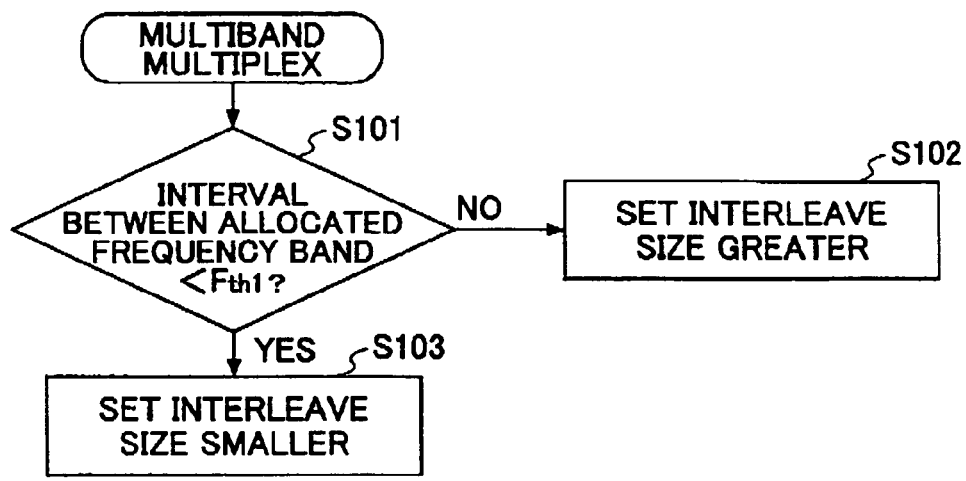
FIG. 5 is a flowchart showing the interleaving operation performed responsive to the interval between allocated frequency bands in multiband multiplexing.

FIG. 5 is a flowchart of the interleave control operation carried out in multiband multiplex according to an embodiment. When the frequency/transmit power allocation unit 106 allocates two or more frequency bands to a single user, or execution of a single application (by multiband multiplexing), the transmission parameter determination unit 111 determines whether the interval between the allocated frequency bands is greater than a prescribed threshold Fth1 (S101). If the interval of the allocated frequency bands is narrower than Fth1 (NO in S101), correlation of fading fluctuation between frequency bands is high, and accordingly, the interleave size is set greater (deeper) to guarantee randomness for the purpose of reducing errors (S102). In contrast, if the interval between the allocated frequency bands is greater than the threshold Fth1 (YES in S101), the correlation between the frequency bands is low, and therefore, the interleave size is set smaller to reduce the processing delay (S103). In this case, even if the interleave is collectively set shallow, the randomness of the bit error is still guaranteed.

Figure 6:
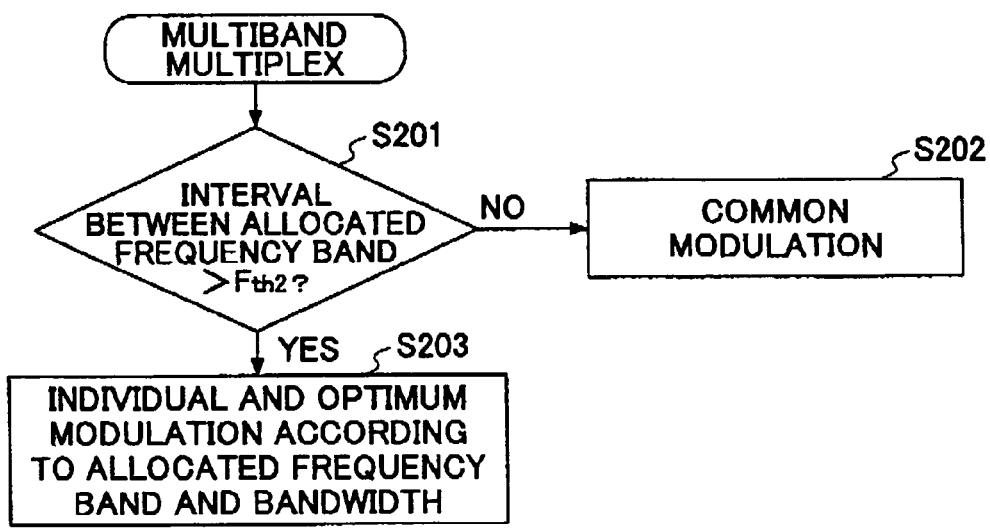
FIG. 6 is a flowchart of the modulating operation performed responsive to the interval between allocated frequency bands in multiband multiplexing.

FIG. 6 is a flowchart of the modulation scheme setting operation carried in multiband multiplexing. In multiband multiplexing, the transmission parameter determination unit 111 determines whether the interval between the allocated frequency bands is greater than a prescribed threshold Fth2 (S201). If the interval of the allocated frequency bands is less than Fth2 (NO in S201), a common modulation technique, such as orthogonal frequency division multiplexing (OFDM), is employed to reduce the interference power levels generated in non-allocated frequency bands (S202). In contrast, if the interval between the allocated frequency bands is greater than the threshold Fth2 (YES in S201), the optimum modulation schemes are selected independently for the allocated frequency bands (S203).

Figure 7:
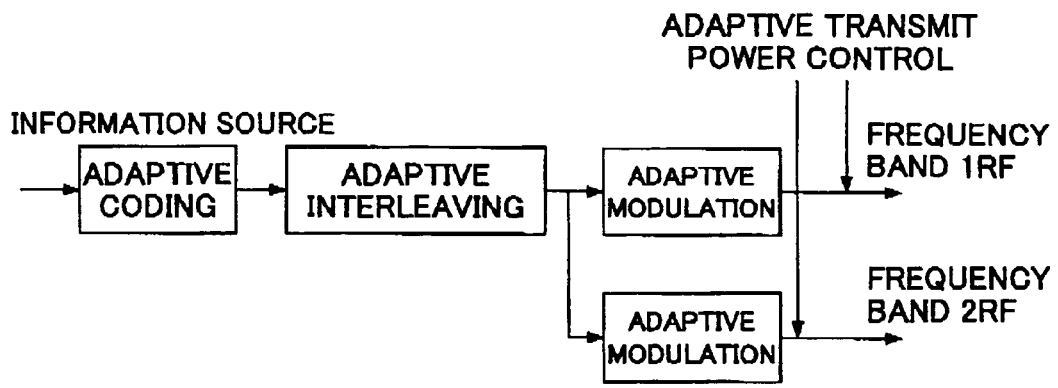
FIG. 7 illustrates an application of multiband multiplexing to an adaptive coding/modulation scheme.

FIG. 7 is a diagram illustrating application of the allocation of multiple frequency bands to an adaptive coding/modulation scheme. To perform adaptive coding, adaptive modulation, and adaptive transmit power control during multiband multiplexing, the baseband signal processing unit 103 performs adaptive coding, adaptive interleaving, and adaptive modulation on the input information (including user data). Transmit power control is also carried out in an adaptive manner. In this case, adaptive modulation is performed independently for each of the allocated frequency bands F1 and F2 in a suitable manner, and then, transmit power control is carried out according to each of the adaptively modulated signals.

The transmission parameter determination unit 111 determines the optimum combination of the modulated signal and a coding scheme for each of the allocated frequency bands and the bandwidths instantaneously according to the channel condition. In multiband multiplexing, the above-described adaptive control is performed commonly or independently for the two or more frequency bands depending on the interval between the allocated frequency bands, as illustrated in FIG. 8.

Figure 8:
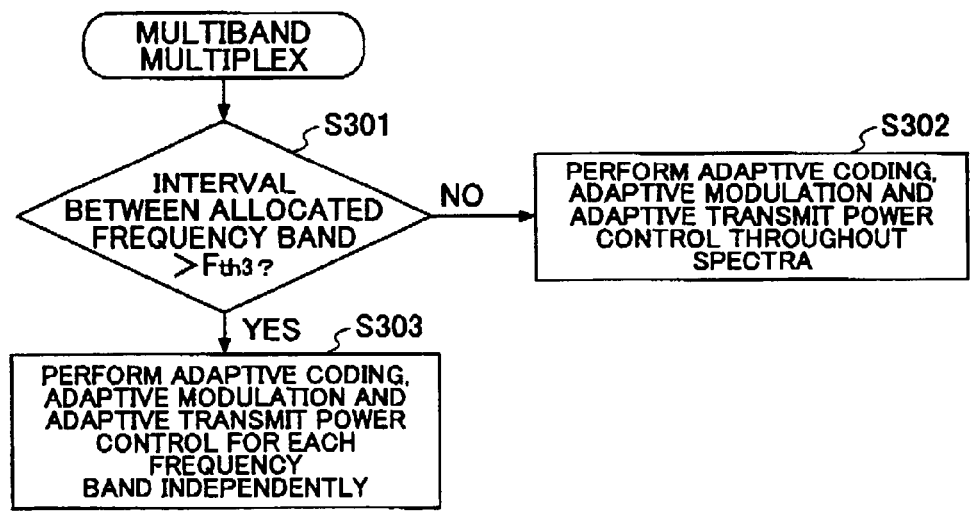
FIG. 8 is a flowchart of adaptive coding/modulation performed responsive to the interval between allocated frequency bands in multiband multiplexing.

FIG. 8 is a flowchart of the adaptive coding/modulation operation in multiband multiplexing. The transmission parameter determination unit 111 determines whether the interval between the allocated frequency bands is greater than a prescribed threshold Fth3 (S301). If the interval of the allocated frequency bands is less than the threshold Fth3 (NO in S301), the two or more frequency bands are regarded as a single frequency band, and adaptive coding, adaptive modulation and adaptive transmit power control are performed collectively for these frequency bands to improve the processing efficiency (S302). If the interval between the allocated frequency bands is greater than the threshold Fth3 (YES in S301), adaptive coding, adaptive modulation and adaptive transmit power control are performed each of the selected frequency bands (S303).

Besides the above-described interleaving operation, the modulation scheme setting operation and the adaptive coding/modulation operation, an accessing scheme and/or interference can be controlled commonly or independently performed depending on the interval between the allocated frequency bands in multiband multiplexing. As the frequency band and its bandwidth vary, the optimum accessing scheme will change. For example, for broadband signals, time division multiple access (TDMA) or frequency division multiple access (FDMA) by OFDM are employed. For middle-width bands, CDMA is employed, while single-carrier TDMA or FDMA is employed for narrowband signals. In this manner, the optimum accessing scheme is selected depending on the frequency band and its bandwidth. Transmit power control may also be performed commonly if correlation between the allocated frequency bands is high, and it may be performed independently if the correlation is low.

To reduce the interference in multiband multiplexing, the transmission parameter determination unit 111 employs a parameter setting scheme according to the interference characteristic of the selected frequency bands. For example, in a licensed frequency band assigned to a certain operator (telecommunication carrier), the operator can control the interference occurring within the carrier. However, in a registration-based frequency band, interference occurs among different operators, and therefore, it is desired to employ a system configuration that can reduce interference toward the other systems as much as possible and is strong against received interference (that is, with an interference canceller function). For an unlicensed band used by arbitrary users, it is difficult to specify the parameters in use because of the interfering radio waves. Accordingly, the parameters are set in multiband multiplexing so as to cancel the interference toward unknown signals.

Returning to FIG. 4, the multi-user scheduling control unit 110 controls transmission scheduling for multiple users based on the information supplied from the instantaneous radio signal fluctuation measuring unit 109 and the user QoS determination unit 108, as well as on the control information supplied from the receiving end. The multi-user scheduling control unit 110 receives instantaneous fluctuation information of desired signals and interference waves in the allocated channel from the instantaneous radio signal fluctuation measuring unit 109, and receives an average transmission rate, delay information (including average delay, maximum delay, and jitter), a frame error rate, and a transmit power level from the user QoS determination unit 108. The multi-user scheduling control unit 110 also reads the priority level of each user and the transmission ability of the user equipment.

Reception power level fluctuates due to fading in both the frequency direction and the time direction, and the fluctuation varies depending on the user location. Accordingly, if priority is given to transmission to those users with good channel conditions, the entire system efficiency is improved. However, since the requested QoS differs among users, scheduling has to be done taking the user QoS into account. If the requested transmission rates are different, packet transmission has to be distributed (scheduled) according to the ratio between the different transmission rates. For a user executing a real-time application, a retransmission packet is preferentially transmitted to reduce delay. In addition, fairness between users has to be guaranteed to some extent, and therefore, scheduling is performed so as to not give preferential treatment those users located near the base station.

In multi-user scheduling across multiple frequency bands, the scheduling algorithm may be changed depending on the interval between allocated frequency bands in order to improve the processing efficiency. If the interval between the allocated frequency bands is wide, correlation between frequency bands is large, and therefore, multi-user scheduling is performed for each of the selected frequency bands. In contrast, with a narrow interval, correlation between frequency bands is small, and therefore, multi-user scheduling is performed collectively throughout the allocated frequency bands, treating the frequency bands as a single band.

Figure 9:
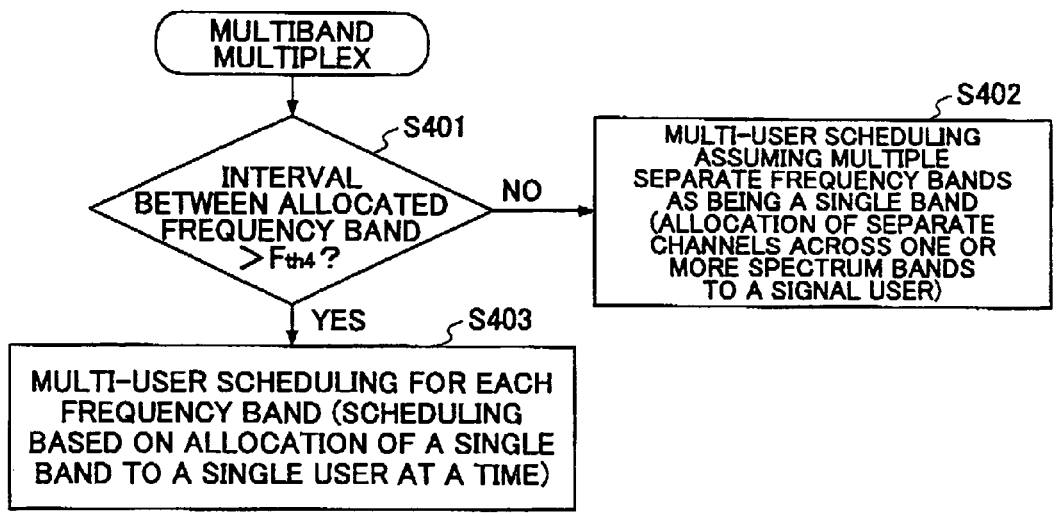
FIG. 9 is a flowchart of multi-user scheduling performed responsive to the interval between allocated frequency bands in multiband multiplexing.

FIG. 9 is a flowchart of the multi-user scheduling operation in multiband multiplexing. The multi-user scheduling control unit 110 determines whether the interval between the allocated frequency bands is greater than a prescribed threshold Fth4 (S401). If the interval of the allocated frequency bands is less than the threshold Fth4 (NO in S401), the two or more frequency bands are regarded as a single band, and multi-user scheduling is performed in common for these frequency bands (S402). This applies to a case in which two or more channels across different frequency bands positioned close to each other are allocated to a single user. If the interval between the allocated frequency bands is greater than the threshold Fth4 (YES in S401), the number of frequency bands allocated to the user at certain time is limited to one in order to perform multi-user scheduling for each of the frequency bands (S403).

With the baseband signal processing and the multi-user scheduling using the optimum parameters, the frequency use efficiency is maximized in the system as a whole.

The multiband RF unit 104 converts the signal having been subjected to the baseband processing into an RF signal using the allocated frequency band, and transmits the RF signal according to the transmission schedule. In the example shown in FIG. 4, when four users are executing associated applications, the control device 105 selects the optimum frequency band for each of the users (or applications) from among those frequency bands currently available in that area within the ability of the user equipment, taking the user QoS into account. Then, the control device 105 sets the optimum parameters according to the fluctuation characteristics of the selected frequency bands. The baseband processing unit 103 performs baseband processing for each of the users. The baseband-processed signals are subjected to transmission scheduling in frequency and time directions so as to guarantee the user QoS and fairness across the multiple frequency bands. The scheduled signals are supplied to the multiband RF unit 104. In this example, frequency bands F1, F2, F3 and F4 are allocated to the execution of four applications. In FIG. 4, the outputs of the multiband RF unit 104 are labeled with different symbols F1-F4 for convenience to indicate these frequency bands are allocated independently from each other; however, some of them may be the same frequency band, or may be different channels in the same frequency band.

Because the multiband RF unit 104 transmits the user data in the scheduled order using the allocated frequency bands, it has to have RF devices capable of handling the frequency bands designated by the baseband signal processing unit 103. In this case, multiple devices may be prepared for the individual RF bands, and these devices may be switched depending on the selected frequency band. Alternatively, and signal transmission in different frequency bands may be implemented by rewriting software, while using a single hardware device, as in the software radio.

With the optimum parameter setting and multi-user scheduling taking into account the user QoS and differences in fluctuation characteristics of different frequency bands, flexible and efficient signal transmission can be realized after multiple frequency bands are allocated to users. Consequently, the frequency use efficiency becomes the maximum in terms of the entire system.

In addition to the maximization of frequency use efficiency under implementation of user QoS, the power consumption of the mobile terminal (or user equipment) can be reduced while maintaining communications area wide. This leads to the advantage that the mobile terminal can be used in any area.

The frequency band allocation technique of the present invention is applicable to mobile communications in which available frequency bands are shared by different systems.

This patent application is based on and claims the benefit of the earlier filing date of Japanese Patent Application No. 2004-275588 filed Sep. 22, 2004, the entire contents of which are hereby incorporated by reference.

What is claimed is:

1. A transmitter comprising:

a frequency allocation unit configured to select and allocate two or more frequency bands that together satisfy a user QoS from among multiple separate frequency bands currently available for the user;

a parameter determination unit configured to determine a transmission parameter required for signal transmission that changes with a value of an interval between the allocated frequency bands; and a multi-user scheduling control unit configured to determine a transmission schedule for multiple users taking into account the frequency bands allocated to the multiple users, wherein the transmission parameter determination unit regulates an optimum transmission parameter independently for each of the allocated frequency bands if the interval between the allocated frequency bands is greater than a prescribed interval, and regulates the optimum transmission parameter collectively for the allocated frequency bands if the interval between the allocated frequency bands is smaller than the prescribed interval.

2. A multiband mobile communication system including a mobile station and a base station, in which multiple separate frequency bands are available for communications and at least one of the mobile station and the base station is furnished with a transmitter capable of allocation of the multiple separate frequency bands, wherein the transmitter comprises:

a frequency allocation unit configured to select and allocate two or more frequency bands that together satisfy a user QoS from among multiple separate frequency bands currently available for the user;

a parameter determination unit configured to determine a transmission parameter required for signal transmission that changes with a value of an interval between the allocated frequency bands; and a multi-user scheduling control unit configured to determine a transmission schedule for multiple users taking into account the frequency bands allocated to the multiple users, wherein the transmission parameter determination unit regulates an optimum transmission parameter independently for each of the allocated frequency bands if the interval between the allocated frequency bands is greater than a prescribed interval, and regulates the optimum transmission parameter collectively for the allocated frequency bands if the interval between the allocated frequency bands is smaller than the prescribed interval.

* * * * *